(12) United States Patent
Pang Wai Tung (10) Patent No.: US 11,305,952 B2
(45) Date of Patent: Apr. 19, 2022

(54) WINE CABINET

(71) Applicant: Coogan Company Limited, Hong Kong (HK)

(72) Inventor: Peter Pang Wai Tung, Hong Kong (HK)

(73) Assignee: Coogan Company Limited, Hong Kong (HK)

( * ) Notice: Subject to any disclaimer, the term of this patent is extended or adjusted under 35 U.S.C. 154(b) by 159 days.

(21) Appl. No.: 16/874,336

(22) Filed: May 14, 2020

(65) Prior Publication Data

US 2020/0361724 A1 Nov. 19, 2020

(30) Foreign Application Priority Data

May 15, 2019 (HK) .................................. 19123854.2

(51) Int. Cl.
*B65G 65/38* (2006.01)
*A47F 3/00* (2006.01)
*A47B 73/00* (2006.01)
*A47B 96/20* (2006.01)

(52) U.S. Cl.
CPC .............. *B65G 65/38* (2013.01); *A47B 73/00* (2013.01); *A47B 96/20* (2013.01); *A47B 2220/0077* (2013.01); *A47F 3/00* (2013.01); *A47F 2003/008* (2013.01); *B65G 2201/0244* (2013.01)

(58) Field of Classification Search
CPC .. A47F 3/00; A47F 3/02; A47F 3/0404; A47F 3/0408; A47F 3/0478; A47F 3/12; A47F 3/125; A47F 3/005; A47F 2003/008; A47B 2220/0077; A47B 96/20; A47B 73/00; B65G 65/38; B65G 2201/0244
See application file for complete search history.

(56) References Cited

U.S. PATENT DOCUMENTS

| 1,128,522 | A | * | 2/1915 | Ross | G09F 7/00 40/446 |
| 1,966,964 | A | * | 7/1934 | Kennedy | A47F 3/12 312/114 |
| 2,001,106 | A | * | 5/1935 | Mullen | A47F 3/005 312/138.1 |
| 2,294,689 | A | * | 9/1942 | O'Reilly | G07F 9/10 312/222 |
| 2,463,037 | A | * | 3/1949 | Holm | A47F 3/02 312/34.23 |

(Continued)

*Primary Examiner* — Patrick D Hawn
(74) *Attorney, Agent, or Firm* — Muncy, Geissler, Olds & Lowe, P.C.

(57) ABSTRACT

A wine cabinet, which comprises a main cabinet body, and further comprises a transparent display cabinet body arranged at a top end of the main cabinet body, a control mechanism, a driving mechanism connected with the control mechanism, and an automatic lifting and sliding mechanism connected with the driving mechanism. A display chamber of the display cabinet body is separated from a storage chamber of the main cabinet body by a laminated plate, the control mechanism, the driving mechanism and the automatic lifting and sliding mechanism are arranged in the storage chamber, and an opening is arranged at a side of the top end of the display cabinet body. The opening is covered with a transparent movable cover plate and the automatic lifting and sliding mechanism is connected with the movable cover plate.

18 Claims, 7 Drawing Sheets

(56) References Cited

U.S. PATENT DOCUMENTS

| | | | | | |
|---|---|---|---|---|---|
| 2,545,575 | A | * | 3/1951 | Gauvreau | A47F 3/08 312/132 |
| 2,602,015 | A | * | 7/1952 | Newman | A47F 3/043 312/138.1 |
| 2,735,739 | A | * | 2/1956 | Path | A47F 3/005 312/31 |
| 2,750,758 | A | * | 6/1956 | Hoye | F25D 21/00 62/155 |
| 2,971,675 | A | * | 2/1961 | Allegri | G07F 9/10 221/124 |
| 3,359,050 | A | * | 12/1967 | Dongus | A47F 3/0426 312/321.5 |
| 3,604,772 | A | * | 9/1971 | Smith | A47F 7/288 312/35 |
| 3,697,147 | A | * | 10/1972 | Schulte | A47B 96/205 312/111 |
| 4,067,477 | A | * | 1/1978 | Chalabian | G07F 11/045 221/1 |
| 4,167,298 | A | * | 9/1979 | Plattner | E05F 1/1075 217/60 R |
| 4,274,551 | A | * | 6/1981 | Hicks | A47J 37/045 221/150 R |
| 4,928,413 | A | * | 5/1990 | Rutchik | G09F 11/30 40/508 |
| 4,948,203 | A | * | 8/1990 | Amstutz | A47F 3/005 312/140 |
| 4,955,044 | A | * | 9/1990 | Amstutz | A47F 3/005 312/114 |
| 5,249,855 | A | * | 10/1993 | Franklin | A47F 3/002 16/243 |
| 5,447,366 | A | * | 9/1995 | Cole | A47F 3/005 312/202 |
| 5,820,233 | A | * | 10/1998 | Hahn | A47F 3/005 312/114 |
| 5,853,235 | A | * | 12/1998 | Barnes | A47F 3/002 312/117 |
| 6,467,649 | B1 | * | 10/2002 | Ullman | G07F 11/045 221/192 |
| 6,634,460 | B1 | * | 10/2003 | Hackenberg | A47F 3/007 186/38 |
| 6,851,770 | B2 | * | 2/2005 | Canedy | A47F 3/002 312/114 |
| 7,640,696 | B2 | * | 1/2010 | Yingst | A47F 10/06 49/152 |
| 7,905,560 | B2 | * | 3/2011 | Vardaro | A47F 3/002 312/310 |
| 8,292,376 | B1 | * | 10/2012 | Stelmasik | E05F 1/1091 312/139 |
| 8,857,666 | B2 | * | 10/2014 | O'Keefe, Jr. | B67D 1/0885 222/132 |
| 9,078,531 | B1 | * | 7/2015 | Medawar | A47F 3/002 |
| 9,226,600 | B2 | * | 1/2016 | Carter | A47F 3/0469 |
| 9,364,101 | B1 | * | 6/2016 | Anderson | A47F 3/007 |
| 9,557,004 | B1 | * | 1/2017 | McGrath | F21V 19/008 |
| 10,527,276 | B2 | * | 1/2020 | Dunn | A47F 3/001 |
| 10,646,057 | B2 | * | 5/2020 | Charlier | A47F 3/007 |
| 10,820,701 | B2 | * | 11/2020 | Sobolewski | A47B 96/205 |
| 10,973,320 | B2 | * | 4/2021 | Lee | A47B 73/006 |
| 11,147,394 | B2 | * | 10/2021 | Vogler | A47F 5/0025 |
| 2007/0233567 | A1 | * | 10/2007 | Daly | G07G 1/00 705/14.69 |
| 2015/0176316 | A1 | * | 6/2015 | Tschap | E05D 3/12 16/277 |
| 2016/0242571 | A1 | * | 8/2016 | Anderson | A47F 3/0434 |
| 2019/0090659 | A1 | * | 3/2019 | Fixler | A47F 3/14 |
| 2020/0069077 | A1 | * | 3/2020 | Jain | A47F 3/02 |

* cited by examiner

WINE CABINET

This nonprovisional application claims priority under 35 U.S.C. § 119(a) to Hong Kong Patent Application No. 19123854.2, which was filed in Hong Kong on May 15, 2019, and which is herein incorporated by reference.

BACKGROUND OF THE INVENTION

Field of the Invention

The present invention relates to a wine cabinet.

Description of the Background Art

The existing wine cabinet usually only has a cabinet body for placing wine, but does not have a cabinet body for displaying wine treasured, loved or used for decoration by users, so that the use purpose is single and cannot meet the use requirements of users.

Although some wine cabinets have cabinet bodies that can display wine treasured, loved or used for decoration by users, most of these wine cabinets are provided with doors which are opened to take out the wine, and this mode limits the space location and occupies the space.

SUMMARY OF THE INVENTION

It is therefore an object of the present invention to overcome the defects of the technology above, and provide a wine cabinet with multiple functions, and space cannot be occupied in an opening mode of a display cabinet body.

The present invention provides a wine cabinet, which comprises a main cabinet body, and further comprises a transparent display cabinet body arranged at a top end of the main cabinet body, a control mechanism, a driving mechanism connected with the control mechanism, and an automatic lifting and sliding mechanism connected with the driving mechanism, wherein a display chamber of the display cabinet body is separated from a storage chamber of the main cabinet body by a laminated plate, the control mechanism, the driving mechanism and the automatic lifting and sliding mechanism are arranged in the storage chamber, an opening is arranged at a side of the top end of the display cabinet body, the opening is covered with a transparent movable cover plate, the automatic lifting and sliding mechanism is connected with the movable cover plate, and the automatic lifting and sliding mechanism can be driven to move in the storage chamber by the driving mechanism and can drive the movable cover plate to move, so as to open or close the opening of the display cabinet body.

Further, the automatic lifting and sliding mechanism comprises two mounting pieces mounted in two opposite inner walls of the storage chamber, a frame, two pairs of driven gear sets, a bearing and a main gear;

each of the mounting pieces is provided with two L-shaped rails staggered up and down, and the two L-shaped rails are parallel to each other and corresponding to the opening of the display cabinet body;

the frame comprises two fixing pieces and a mounting plate connected between the two fixing pieces, and the driving mechanism is arranged on the mounting plate;

each pair of the driven gear sets comprise a first gear and a second gear, the first gear and the second gear are driven by a belt, the first gear and the second gear of each pair of the driven gear sets are arranged on one fixing piece, the first gear and the second gear are respectively meshed with the two L-shaped rails of one mounting piece, and the first gear and the second gear can be respectively moved on the corresponding L-shaped rail;

one end of the bearing is fixed to the first gear of one pair of the driven gear sets, and the other end is fixed to the first gear of the other pair of the driven gear sets; and the main gear is fixedly sleeved on the bearing, and the main gear and a driving gear of the driving mechanism are driven by a belt.

Further, the automatic lifting and sliding mechanism further comprises two connecting pieces, one ends of the two connecting pieces are respectively arranged at top ends of the two fixing pieces, the other ends of the two connecting pieces are respectively arranged at a bottom end of the movable cover plate, when the first gear and the second gear are respectively moved from an end position of a vertical part of the corresponding L-shaped rail to an end position of a transverse part of the corresponding L-shaped rail, the movable cover plate is driven by the two connecting pieces to rise and move along a side of the top end of the display cabinet body far away from the opening, so that the movable cover plate is far away from the opening to open the display cabinet body, when the first gear and the second gear are respectively moved from the end position of the transverse part of the corresponding L-shaped rail to the end position of the vertical part of the corresponding L-shaped rail, the movable cover plate is driven by the two connecting pieces to move along a side of the top end of the display cabinet body close to the opening and descend, so that the movable cover plate is covered to the opening to close the opening of the display cabinet body.

Further, the wine cabinet further comprises two spring assemblies arranged in the two opposite inner walls of the storage chamber, and the two spring assemblies are respectively located below the vertical parts of the L-shaped rails of the two mounting pieces; the spring assembly comprises a supporting plate mounted in the corresponding inner wall of the storage chamber, a pillar mounted in the supporting plate, a mounting frame piece mounted in the pillar, a supporting piece rotatably mounted at an end of the pillar far away from the supporting plate, and an elastic piece, one end of the elastic piece is connected with one end of the supporting piece, the other end of the elastic piece is connected with the mounting frame piece, the supporting piece is located between the pillar and the corresponding inner wall of the storage chamber, and a placing piece is arranged at a position of the pillar below the supporting piece for limiting a rotational position of the supporting piece; and a side wall of the fixing piece close to a front side of the main cabinet body is an inclined wall, when the first gear and the second gear are respectively moved from the end position of the transverse part of the corresponding L-shaped rail to the end position of the vertical part of the corresponding L-shaped rail, the inclined side wall of the fixing piece is placed on the corresponding supporting piece, and the supporting piece is abutted against the corresponding placing piece.

Further, both sides of the laminated plate are respectively provided with an accommodation space, and the two connecting pieces are respectively located in the corresponding accommodation space.

Further, the first gear and the second gear are respectively meshed with teeth at a bottom part of the corresponding L-shaped rail.

Further, the driving mechanism is a motor, the control mechanism comprises a control unit and a detection unit connected with the control unit, the motor is connected with the control unit, the detection unit is used for detecting a torque of the motor and outputting the torque to the control unit, the control unit is used for comparing the torque of the motor received with a preset torque, when the movable cover plate is moved to open the opening of the display cabinet body, if the torque of the motor exceeds a preset torque, the control unit controls the motor to stop rotating, so that the automatic lifting and sliding mechanism stops driving the movable cover plate to move, and when the movable cover plate is moved to close the opening of the display cabinet body, if the torque of the motor exceeds the preset torque, the control unit controls the motor to rotate reversely, so that the automatic lifting and sliding mechanism is driven to move reversely to recover the movable cover plate to a state in which the opening of the display cabinet body is opened.

Further, the connecting piece is L-shaped and comprises a first connecting part and a second connecting part which are connected together, the first connecting part is arranged at the top end of the corresponding fixing piece, and the second connecting part is arranged at the bottom end of the movable cover plate.

Further, the display cabinet body is made of a single-layer glass, the movable cover plate is made of a double-layer heating wire glass, and both the single-layer glass and the double-layer heating wire glass have a thickness of 6 mm to 8 mm.

Further, a first wine rack is arranged in the storage chamber, the automatic lifting and sliding mechanism is located between the first wine rack and the laminated plate, and the first wine rack has a plurality of storage areas.

Further, a second wine rack is arranged in the display chamber, the second wine rack is inclinedly arranged on the laminated plate, and the second wine rack has a plurality of placing positions.

Further, the wine cabinet further comprises an external control device, wherein the external control device is a remote controller, the control mechanism comprises a control unit, and the remote controller is wirelessly connected with the control unit.

Further, the wine cabinet further comprises an external control device, wherein the external control device is an intelligent terminal, the control mechanism comprises a control unit, the intelligent terminal comprises a control module, and the control module is wirelessly connected with the control unit.

Further, a front side of the main cabinet body is provided with a left cabinet door and a right cabinet door, and top parts of the left cabinet door and the right cabinet door are provided with handles which are close to each other.

Further, the front side of the main cabinet body is provided with a louver structure below the left cabinet door and the right cabinet door.

Further, a rear side wall in the display cabinet body is provided with a mounting plate, a top part of the mounting plate is provided with a first light stripe, and the first light stripe is connected with the control mechanism.

Further, a bottom end of the second connecting part is provided with a second light stripe, and the second light stripe is connected with the control mechanism.

Further, a length of the movable cover plate is equal to a length of the display cabinet body, and a width of the movable cover plate is half of a width of the display cabinet body.

According to the present invention, the arrangement of the display cabinet can be used for displaying wine treasured, loved or used for decoration by users, thus realizing multiple functions, being convenient to use, meeting the use requirements of users, and space cannot be occupied in the opening mode of the display cabinet body. The upper-layer glass display cabinet and the lower cabinet body for storing wine of the wine cabinet can also be designed to display and place Magnum wine bottles of 1.5 L in the present invention, in addition to displaying and placing standard wine bottles of 720 ml.

DETAILED DESCRIPTION

The present invention is further described hereinafter with reference to the drawings and the embodiments.

With reference to FIG. 1 to FIG. 5, the present invention provides a wine cabinet, which comprises a main cabinet body 10, a transparent display cabinet body 30, a control mechanism (not shown in the drawing), a driving mechanism 100 connected with the control mechanism, an automatic lifting and sliding mechanism 80 connected with the driving mechanism 100, and an external control device.

A first wine rack is arranged in a storage chamber 11 of the main cabinet body 10, and the first wine rack is integrally formed by plastic molding. The first wine rack has multiple layers of storage areas arranged side by side along a height direction of the wine cabinet, and the storage areas are used for placing wine such as red wine, white wine and the like. Preferably, each layer of storage area is composed of independent rail components.

A front side of the main cabinet body 10 is provided with a left cabinet door 13 and a right cabinet door 14, and top parts of the left cabinet door 13 and the right cabinet door 14 are provided with handles 15 which are close to each other, so as to facilitate the opening of the left cabinet door 13 and the right cabinet door 14.

The front side of the main cabinet body 10 is provided with a louver structure 16 below the left cabinet door 13 and the right cabinet door 14, and the louver structure 16 is used for conveying external air into the storage chamber 11, so as to keep a relative humidity in the wine cabinet between 55% and 75%.

Universal wheels 17 are respectively arranged at four corners of a bottom end of the main cabinet body 10 to facilitate the movement of the wine cabinet.

The display cabinet body 30 is arranged at a top end of the main cabinet body 10. A display chamber 33 of the display cabinet body 30 is separated from the storage chamber 11 of the main cabinet body 10 by a laminated plate 50.

An opening 31 is arranged at a side of the top end of the display cabinet body 30 and the opening 31 is covered with a transparent movable cover plate 32. In the embodiment, an opening 31 is arranged at a front side of the top end of the display cabinet body 30. A length of the movable cover plate 32 is equal to a length of the display cabinet body 30, and a width of the movable cover plate 32 is half of a width of the display cabinet body 30.

In the embodiment, the display cabinet body 30 is made of a single-layer glass, the movable cover plate 32 is made of a double-layer heating wire glass, and compared with a framed display cabinet body in the prior art, the display cabinet body 30 of the present invention is frameless and novel in design. Both the single-layer glass and the double-layer heating wire glass have a thickness of 6 mm to 8 mm. It can be understood that materials of the display cabinet body 30 and the movable cover plate 32 can be set according to actual conditions.

A second wine rack 34 is arranged in the display chamber 33, the second wine rack 34 is inclinedly arranged on the laminated plate 50, and the second wine rack 34 has a plurality of placing positions 341 arranged in sequence along a length direction of the wine cabinet for placing wine, such as wine treasured, loved or used for decoration by users.

The control mechanism, the driving mechanism 100, and the automatic lifting and sliding mechanism 80 are arranged in the storage chamber 11. The control mechanism comprises a control unit. The control unit is preferably a computer chipset 8051 or a computer chipset equivalent to 8051. The driving mechanism 100 is preferably a motor.

Figure 6:
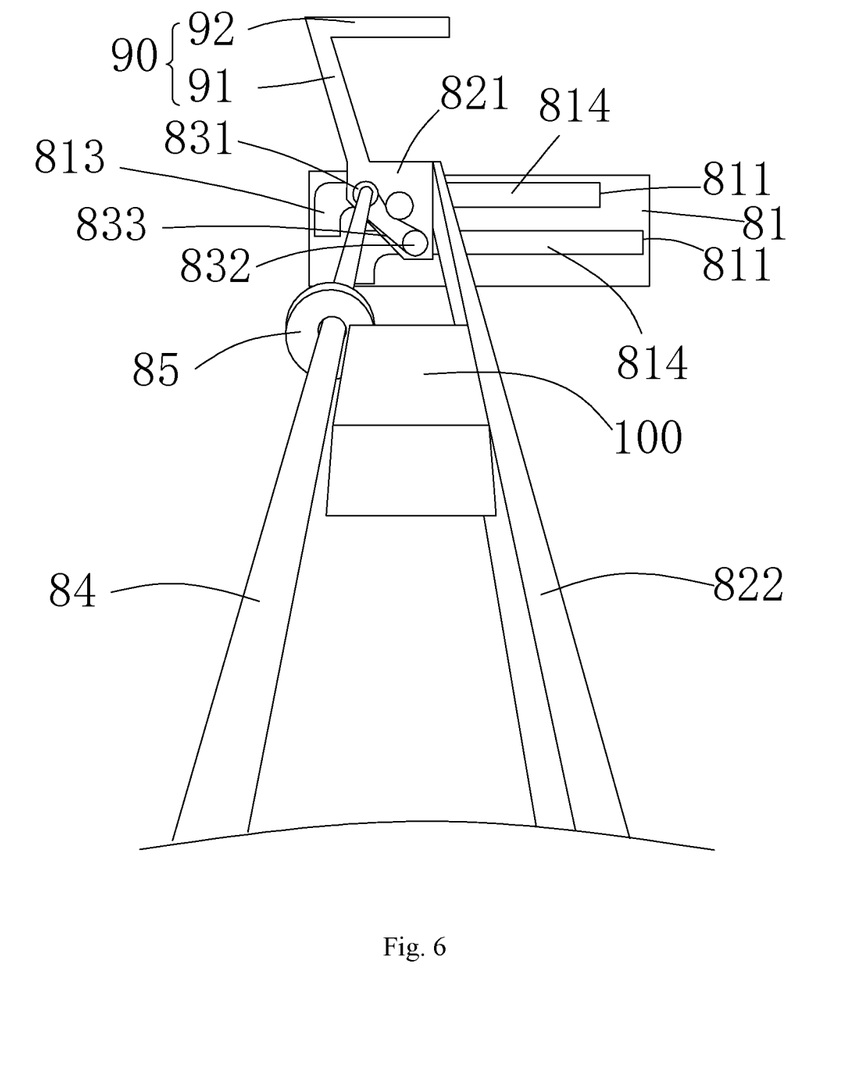
FIG. 6 is a local diagram of an automatic lifting and sliding mechanism of the wine cabinet shown in FIG. 1.

The automatic lifting and sliding mechanism 80 is located between the first wine rack 12 and the laminated plate 50. The automatic lifting and sliding mechanism 80 is connected with the movable cover plate 32, the automatic lifting and sliding mechanism 80 can be driven to move in the storage chamber 11 by the driving mechanism 100 and can drive the movable cover plate 32 to move, so as to open or close the opening 31 of the display cabinet body 30. In this way, when the opening 31 of the display cabinet body 30 is opened, as shown in FIG. 6, wine can be taken out of or put into the display chamber 33 of the display cabinet body 30 through the opening 31, or the display chamber 33 of the display cabinet body 30 is cleaned through the opening 31. When the opening 31 of the display cabinet body 30 is closed, the movable cover plate 32 and the display cabinet body 30 can be used together as an integral cabinet body, and can be used for displaying or storing, for example, wine treasured, loved or used for decoration by users and the like, thus facilitating the use of users.

Figure 7:
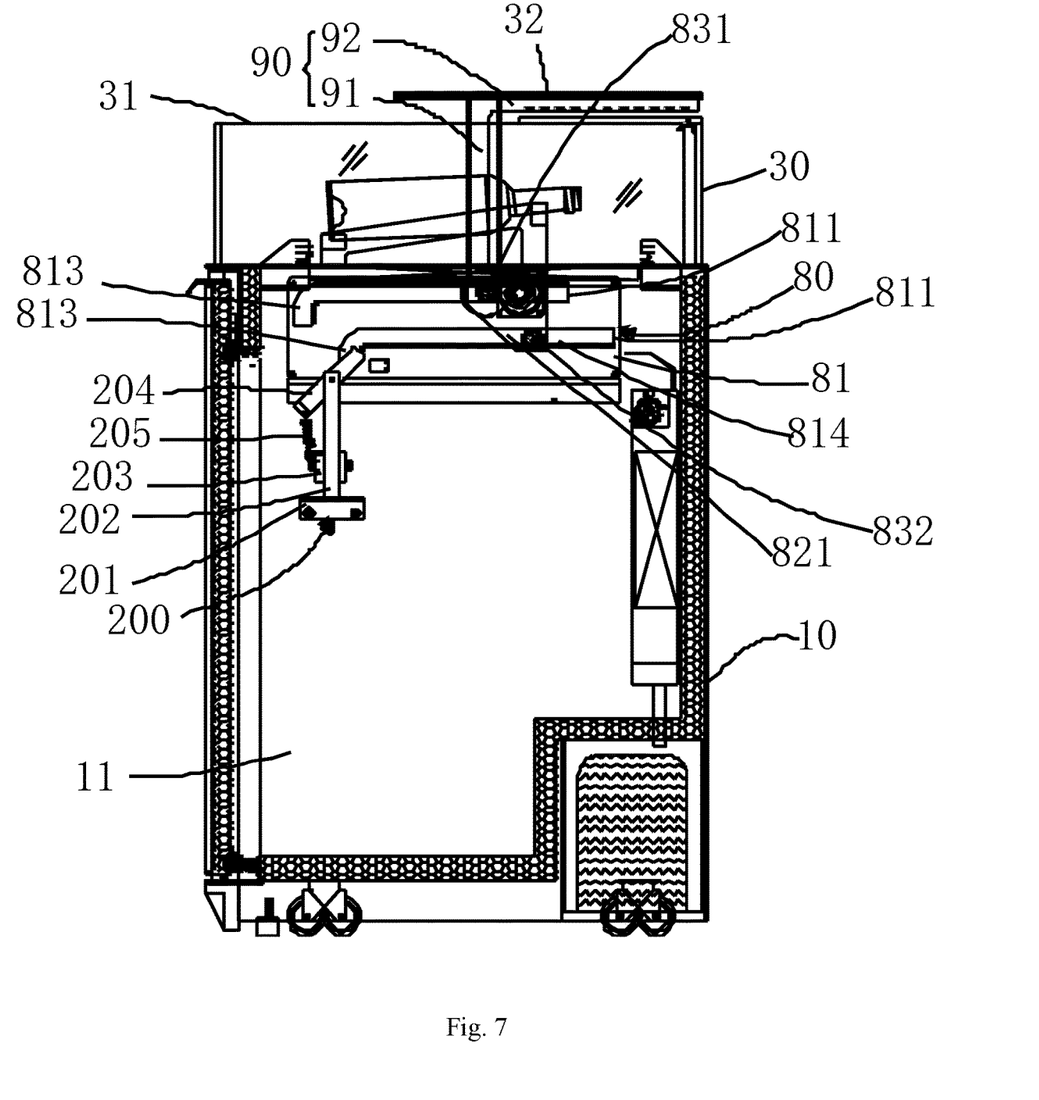
FIG. 7 is a cross-section view of the wine cabinet shown in FIG. 1 with a movable cover plate opened.

With reference to FIG. 6 and FIG. 7, specifically, in the embodiment, the automatic lifting and sliding mechanism 80 comprises two mounting pieces 81 mounted in two opposite inner walls of the storage chamber 11, a frame, two pairs of driven gear sets, a bearing 84, a main gear 85, and two connecting pieces 90. The two mounting pieces 81 are preferably located at both ends of the main cabinet body 10.

Each of the mounting pieces 81 is provided with two L-shaped rails 811 staggered up and down, and the two L-shaped rails 811 are parallel to each other and corresponding to the opening 31 of the display cabinet body 30. In the embodiment, a vertical part 813 of the L-shaped rail 811 is close to the front side of the main cabinet body 10.

The frame comprises two fixing pieces 821 and a mounting plate 822 connected between the two fixing pieces 821, and the driving mechanism 100 is arranged on the mounting plate 822.

Each pair of the driven gear sets comprise a first gear 831 and a second gear 832, the first gear 831 and the second gear 832 are driven by a belt 833, the first gear 831 and the second gear 832 of each pair of the driven gear sets are arranged on one fixing piece 821, the first gear 831 and the second gear 832 are respectively meshed with two L-shaped rails 811 of one mounting piece 81, and the first gear 831 and the second gear 832 can be respectively moved on the corresponding L-shaped rail 811. A connecting line of a center of the first gear 831 and a center of the second gear 832 of each pair of the driven gear sets is inclined with respect to the corresponding L-shaped rail 811. In the embodiment, the first gear 831 and the second gear 832 are respectively meshed with teeth 812 (referring to FIG. 4) at a bottom part of the corresponding L-shaped rail 811.

One end of the bearing 84 is fixed to the first gear 831 of one pair of the driven gear sets, and the other end is fixed to the first gear 831 of the other driven gear set. The bearing 84 is arranged in parallel to the mounting plate 822. Extension directions of the bearing 84 and the mounting plate 822 are the same as a length extension direction of the main cabinet body 10.

The main gear 85 is fixedly sleeved on the bearing 84, and the main gear 85 and the driving mechanism 100 are driven by a belt.

One ends of the two connecting pieces 90 are respectively arranged at top ends of the two fixing pieces 821, the other ends of the two connecting pieces are respectively arranged at a bottom end of the movable cover plate 32.

Figure 5:
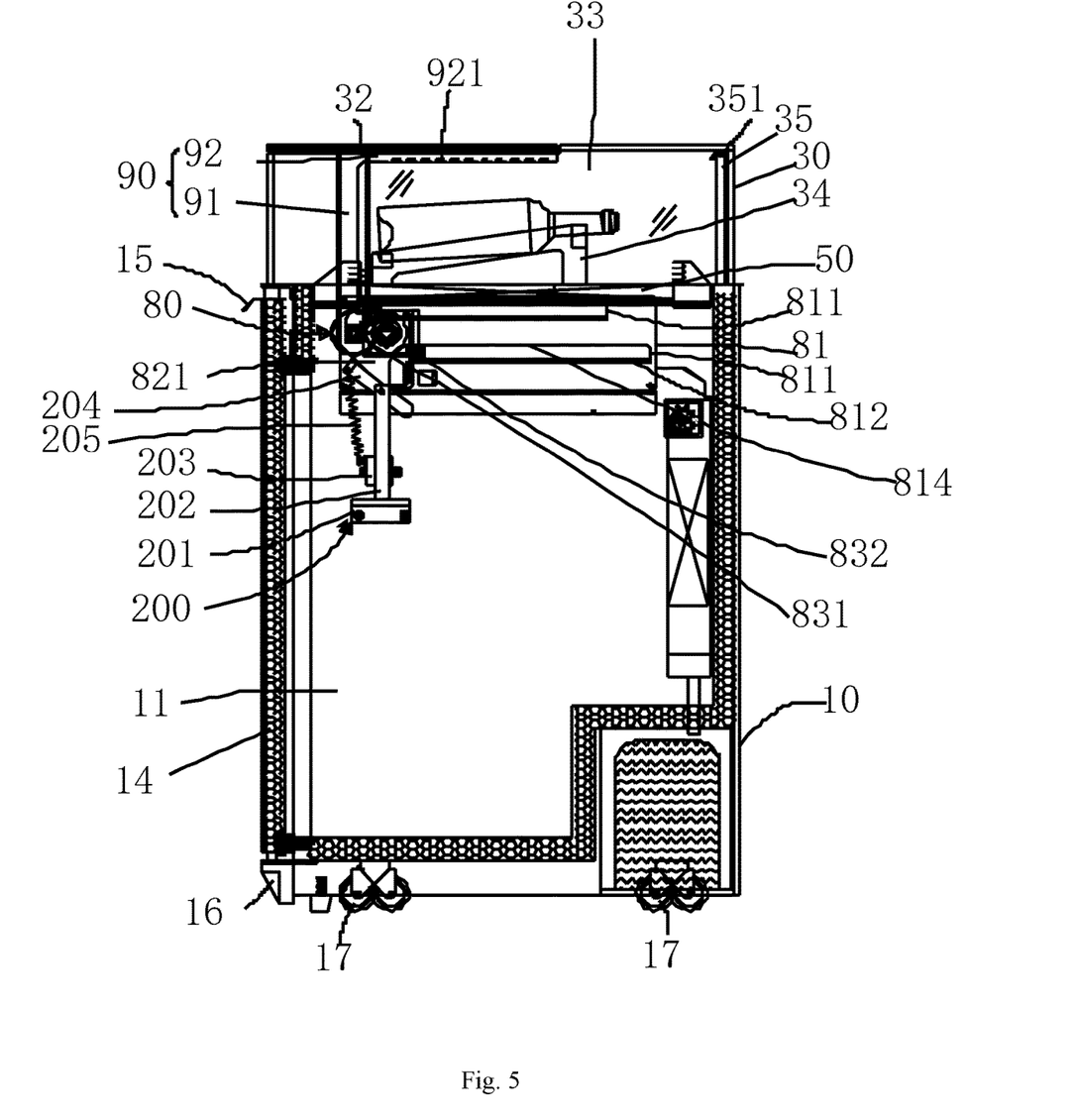
FIG. 5 is a side cross-section view of the wine cabinet shown in FIG. 1.

The working principle of the automatic lifting and sliding mechanism 80 is that: when the opening 31 of the display cabinet body 30 is opened, the control unit controls the driving mechanism 100, for example, to rotate in a counterclockwise direction, the driving gear of the driving mechanism 100 drives the main gear 85 to rotate in a clockwise direction, the main gear 85 drives the bearing 84 to rotate in a clockwise direction, the bearing 84 drives the two first gears 831 to rotate in a clockwise direction, the two first gears 831 drive the two second gears 832 to rotate in a clockwise direction, the two first gears 831 and the two second gears 832 are moved along the L-shaped rail 811 from an end position of the vertical part 813 of the L-shaped rail 811 to an end position of a transverse part 814 of the L-shaped rail 811 while being rotated, the two connecting pieces 90 are driven to move during the movement, the movable cover plate 32 is driven by the two connecting pieces 90 to rise and move along a side of the top end of the display cabinet body 30 far away from the opening 31, i.e., a rear side of the display cabinet body 30, so that the movable cover plate 32 is far away from the opening 31 to open the opening 31 of the display cabinet body 30, as shown in FIG. 7. When the opening 31 of the display cabinet body 30 is closed, the control unit controls the driving mechanism 100, for example, to rotate in a clockwise direction, the driving gear of the driving mechanism 100 drives the main gear 85 to rotate in a counterclockwise direction, the main gear 85 drives the bearing 84 to rotate in a counterclockwise direction, the bearing 84 drives the two first gears 831 to rotate in a counterclockwise direction, the two first gears 831 drive the two second gears 832 to rotate in a counterclockwise direction, the two first gears 831 and the two second gears 832 are moved along the L-shaped rail 811 from the end position of the transverse part 814 of the L-shaped rail 811 to the end position of the vertical part 813 of the L-shaped rail 811 while being rotated, the two connecting pieces 90 are driven to move during the movement, the movable cover plate 32 is driven by the two connecting pieces 90 to move along a side of the top end of the display cabinet body 30 close to the opening 31, i.e., a front side of the display cabinet body 30, and descend, so that the movable cover plate 32 is covered to the opening 31 to close the opening 31 of the display cabinet body 30, as shown in FIG. 5.

In the embodiment, a height of the vertical part 813 of the L-shaped rail 811 is greater than a thickness of the top end of the display cabinet body 30, so that the movable cover plate 32 cannot touch the rear side of the top end of the display cabinet body 30 during the movement after lifting.

Both sides of the laminated plate 50 are respectively provided with an accommodation space, and the two connecting pieces 90 are respectively located in the accommodation space, so as to facilitate the movement of the two connecting pieces 90.

Preferably, the connecting piece 90 is L-shaped and comprises a first connecting part 91 and a second connecting part 92 which are connected together, the first connecting part 91 is arranged at the top end of the corresponding fixing piece 821, and the second connecting part 92 is arranged at the bottom end of the movable cover plate 32.

Figure 1:
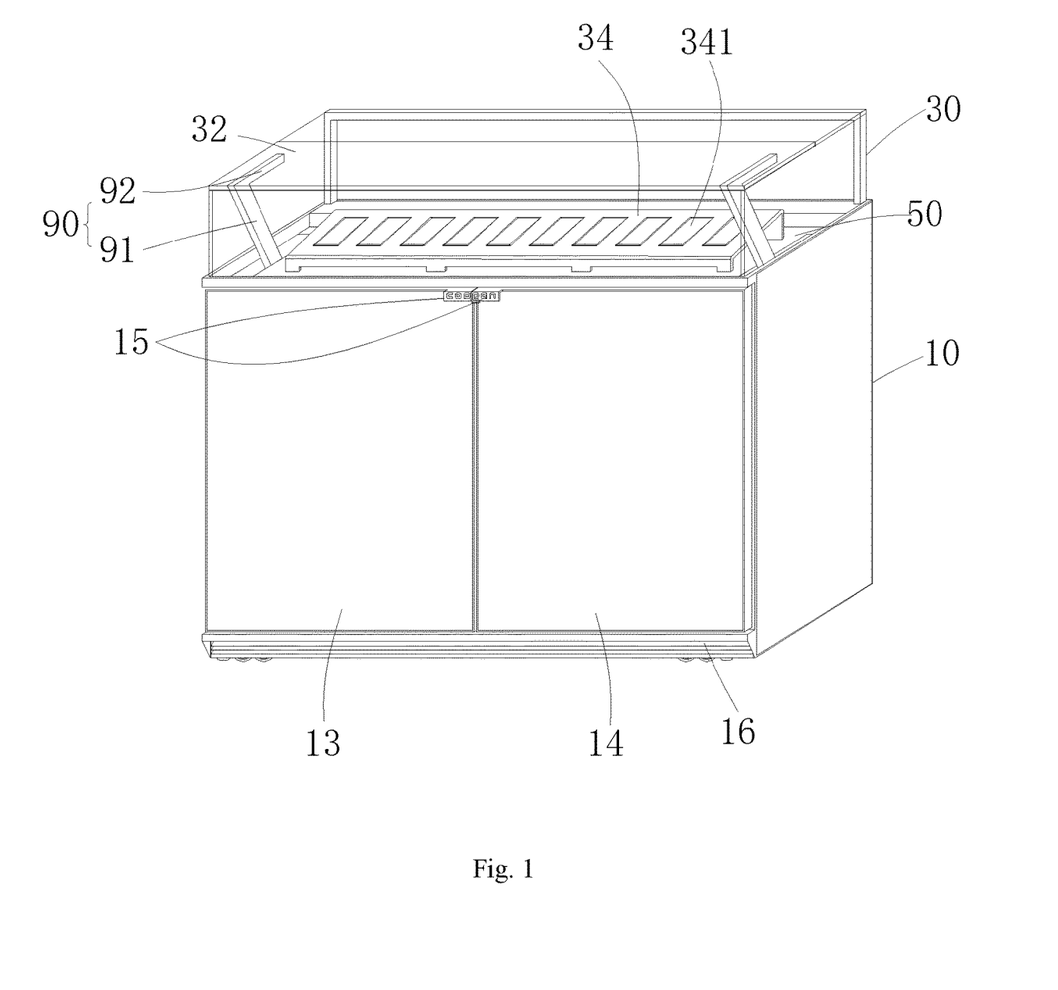
FIG. 1 is a structure diagram of a wine cabinet provided by an embodiment of the present invention.
Figure 2:
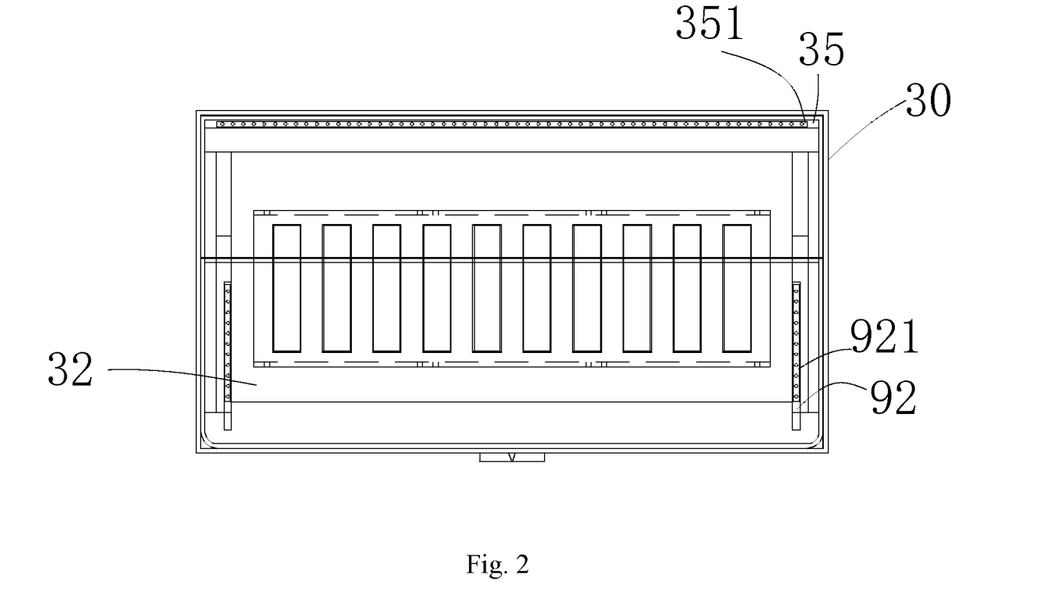
FIG. 2 is a top view of the wine cabinet shown in FIG. 1.
Figure 3:
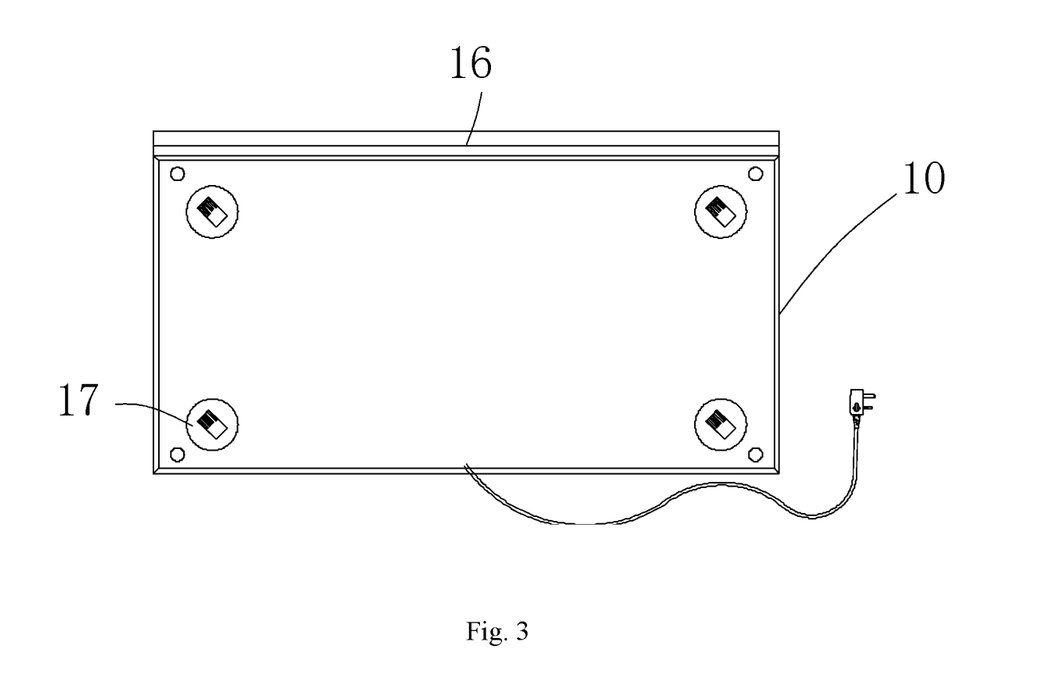
FIG. 3 is a bottom view of the wine cabinet shown in FIG. 1.
Figure 4:
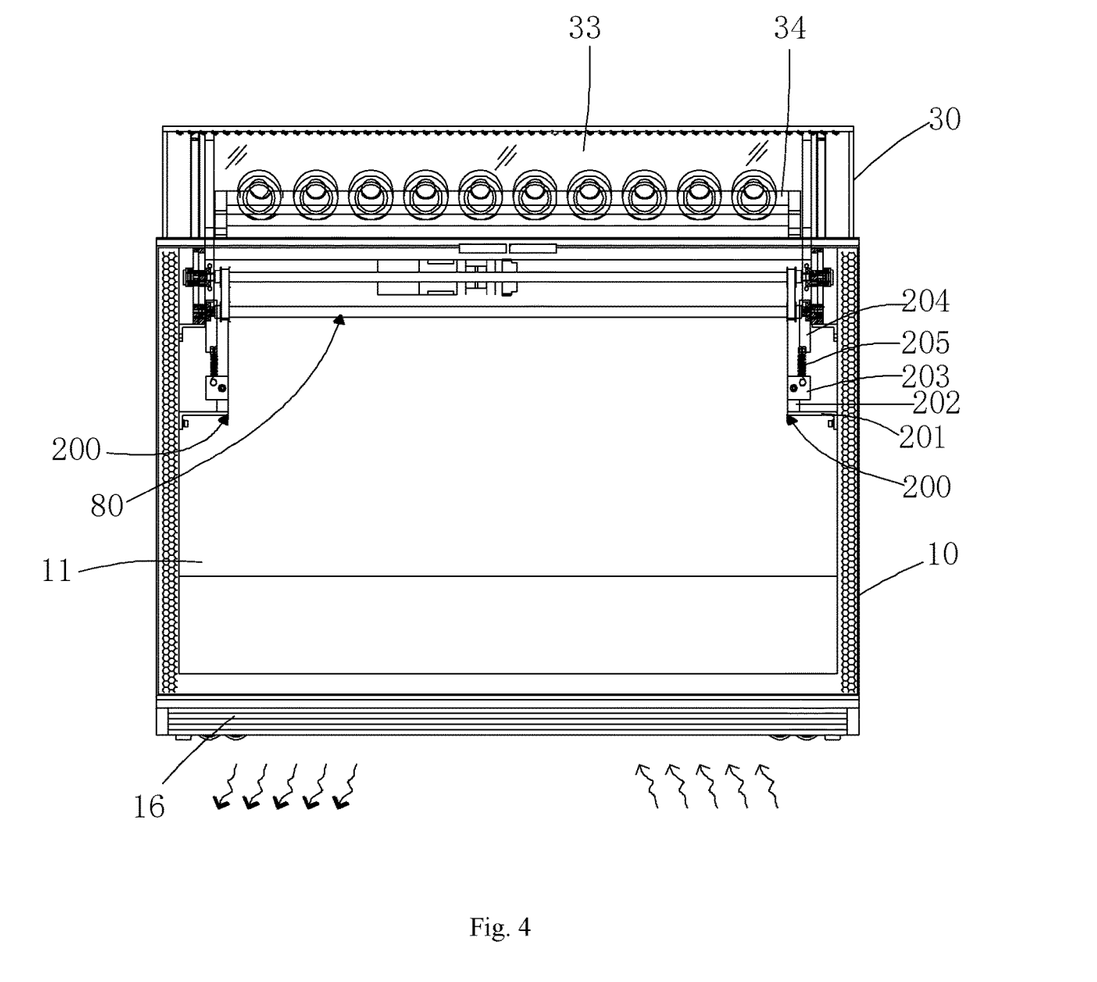
FIG. 4 is a front cross-section view of the wine cabinet shown in FIG. 1.

As shown in FIG. 4, FIG. 5 and FIG. 7, the wine cabinet further comprises two spring assemblies 200 arranged in the two opposite inner walls of the storage chamber 11. The two spring assemblies 200 are respectively located below the vertical parts 813 of the L-shaped rails 811 of the two mounting pieces 81. The spring assembly 200 comprises a supporting plate 201 mounted in the corresponding inner wall of the storage chamber 11, a pillar 202 mounted in the supporting plate 201, a mounting frame piece 203 mounted in the pillar 202, a supporting piece 204 rotatably mounted at an end of the pillar 202 far away from the supporting plate 201, and an elastic piece 205. One end of the elastic piece 205 is connected with one end of the supporting piece 204, the other end of the elastic piece is connected with the mounting frame piece 203, and the supporting piece 204 is located between the pillar 202 and the corresponding inner wall of the storage chamber 11. A placing piece (not shown in the drawing) is arranged at a position of the pillar 202 below the supporting piece 204 for limiting a rotational position of the supporting piece 204. A side wall of the fixing piece 821 close to a front side of the main cabinet body 10 is an inclined wall, when the first gear 831 and the second gear 832 are respectively moved from the end position of the transverse part 814 of the corresponding L-shaped rail 811 to the end position of the vertical part 813 of the corresponding L-shaped rail 811, the supporting piece 204 is rotated towards the rear side of the main cabinet body 10 with respect to the pillar 202 under pressing of the fixing piece 821, the inclined side wall of the fixing piece 821 is placed on the corresponding supporting piece 204 (referring to FIG. 5), and the supporting piece 204 is abutted against the corresponding placing piece to prevent the supporting piece 204 from further rotating. By arranging the elastic piece 205, the supporting piece 204 and the placing piece, the automatic lifting mechanism 80 can be supported, and the elastic piece 205 can also play a buffering role to reduce a pressure induction and a stress degree of the motor.

Preferably, the elastic piece 205 is a tension spring. When the inclined side wall of the fixing piece 821 is not placed on the corresponding supporting piece 204, the supporting piece 204 is inclined under an effect of the tension spring, as shown in FIG. 7, when the inclined side wall of the fixing piece 821 is placed on the corresponding supporting piece 204, the supporting piece 204 is rotated towards the rear side of the main cabinet body 10 with respect to the pillar 202 under the pressing of the fixing piece 821, and the tension spring is in an elongated state, as shown in FIG. 5, and when the supporting piece 204 is not pressed by the fixing piece 821, the supporting piece 204 can be recovered to an initial state under the effect of the tension spring, as shown in FIG. 7.

In the embodiment, the control mechanism comprises a detection unit connected with the control unit. The detection unit is used for detecting a torque of the motor and outputting the torque to the control unit, and when the movable cover plate 32 touches a barrier, the motor can be subjected to a torsion effect. The control unit is used for comparing the torque of the motor received with a preset torque, when the movable cover plate 32 is moved to open the opening 31 of the display cabinet body 30, if the torque of the motor exceeds a preset torque, that is, the movable cover plate 32 touches a barrier, the control unit controls the motor to stop rotating, so that the automatic lifting and sliding mechanism 80 stops driving the movable cover plate 32 to move, and when the movable cover plate 32 is moved to close the opening 31 of the display cabinet body 30, if the torque of the motor exceeds the preset torque, that is, the movable cover plate 32 touches a barrier, the control unit controls the motor to rotate reversely, so that the automatic lifting and sliding mechanism 80 is driven to move reversely to recover the movable cover plate 32 to a state in which the opening 31 of the display cabinet body 30 is opened. In the structure, when the movable cover plate 32 is moved to open the opening 31 of the display cabinet body 30, if the movable cover plate 32 touches a barrier, the movable cover plate 32 stops moving under an effect of the automatic lifting and mechanism 80, and when the movable cover plate 32 is moved close the opening 31 of the display cabinet body 30, if the movable cover plate 32 touches a barrier, the movable cover plate 32 can be recovered to the state in which the opening 31 of the display cabinet body 30 is opened under the effect of the automatic lifting and mechanism 80, i.e., automatic springback, so that the movable cover plate 32 is far away from the barrier, the occurrence of accidents can be reduced, and the movable cover plate 32 is protected at the same time.

Further, a rear side wall in the display cabinet body 30 is provided with a mounting plate 35, and a top part of the mounting plate 35 is provided with a first light stripe 351. A bottom end of the second connecting part 92 of the connecting piece 90 is provided with a second light stripe 921. The first light stripe 351 and the second light stripe 921 are respectively connected with the control mechanism. The arrangement of the first light stripe 351 and the second light stripe 921 plays a decorative role and adds aesthetic feeling.

Figure 8:
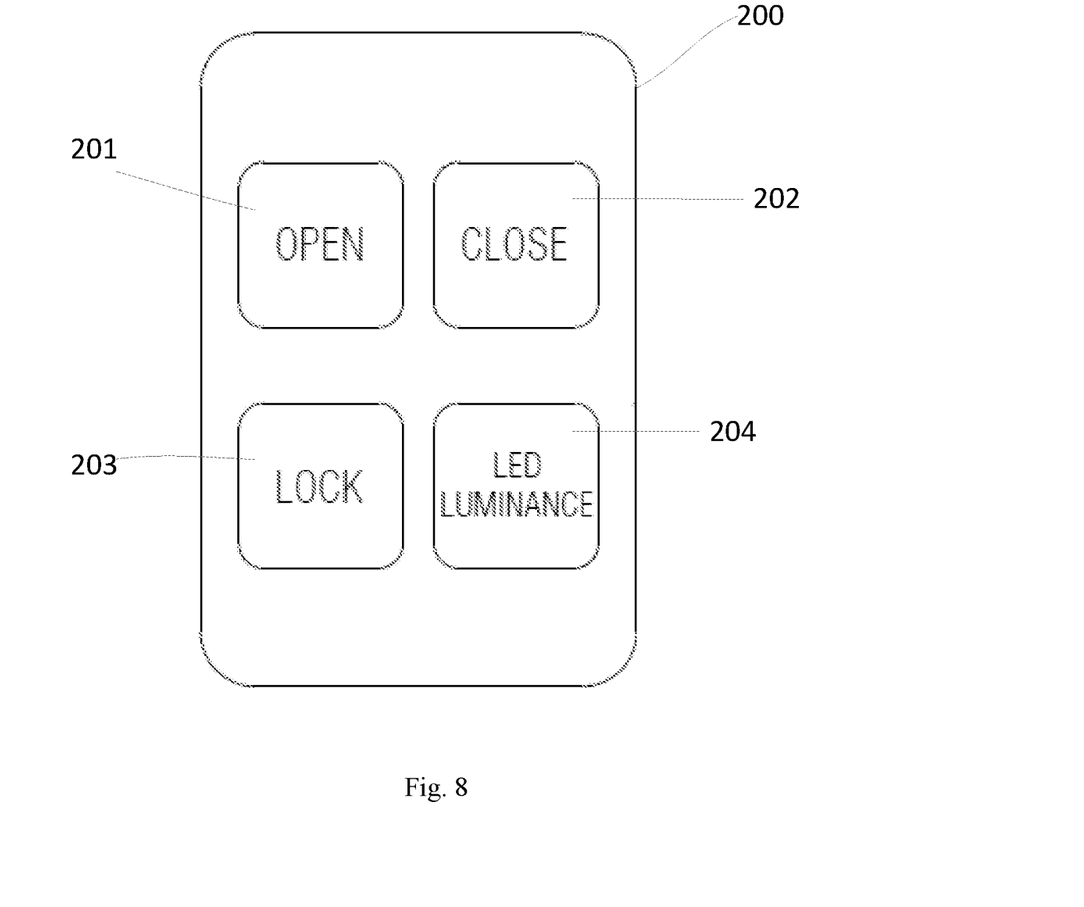
FIG. 8 is a plan diagram of a remote controller of the wine cabinet shown in FIG. 1.

An external control device of the present invention is a remote controller 200, as shown in FIG. 8, and the remote controller 200 is wirelessly connected with the control unit. The remote controller 200 is used for transmitting control signals to the control unit, and the control unit is used for receiving the control signals and controlling the rotation of the motor. The remote controller 200 comprises several keys such as an opening key 201, a closing key 202, a locking key 203, a light key 204, etc.

In an alternative solution, the external control device is an intelligent terminal, the intelligent terminal comprises a control module, and the control module is wirelessly connected with the control unit. The control module is configured to transmitting control signals to the control unit. In actual application, the control module is an APP module integrated on the intelligent terminal, which is convenient to operate. The intelligent terminal is a mobile phone, a tablet personal computer, etc.

The embodiments above are merely preferred embodiments of the present invention, which are described more specific and detailed, but the embodiments cannot be understood as limiting the scope of the invention patent. It shall be indicated that many deformations and improvements, such as combination of different characteristics in each embodiment can be made by those of ordinary skills in the art without departing from the concept of the present invention, and the deformations and improvements shall all fall within the protection scope of the present invention.

What is claimed is:

1. A wine cabinet, comprising a main cabinet body, and further comprising:
   a transparent display cabinet body arranged at a top end of the main cabinet body;
   a control mechanism;
   a driving mechanism connected with the control mechanism; and
   an automatic lifting and sliding mechanism connected with the driving mechanism,
   wherein a display chamber of the display cabinet body is separated from a storage chamber of the main cabinet body by a laminated plate,
   wherein the control mechanism, the driving mechanism and the automatic lifting and sliding mechanism are arranged in the storage chamber,
   wherein an opening is arranged at a side of the top end of the display cabinet body, the opening being covered with a transparent movable cover plate,
   wherein the automatic lifting and sliding mechanism is connected with the movable cover plate, and
   wherein the automatic lifting and sliding mechanism is adapted to be driven to move in the storage chamber by the driving mechanism and adapted to drive the movable cover plate to move, so as to open or close the opening of the display cabinet body.

2. The wine cabinet according to claim 1, wherein the automatic lifting and sliding mechanism comprises two mounting pieces mounted in two opposite inner walls of the storage chamber, a frame, two pairs of driven gear sets, a bearing and a main gear;
   each of the mounting pieces is provided with two L-shaped rails staggered up and down, and the two L-shaped rails are parallel to each other and corresponding to the opening of the display cabinet body;
   the frame comprises two fixing pieces and a mounting plate connected between the two fixing pieces, and the driving mechanism is arranged on the mounting plate;
   each pair of the driven gear sets comprise a first gear and a second gear, the first gear and the second gear are driven by a belt, the first gear and the second gear of each pair of the driven gear sets are arranged on one fixing piece, the first gear and the second gear are respectively meshed with the two L-shaped rails of one mounting piece, and the first gear and the second gear can be respectively moved on the corresponding L-shaped rail;
   one end of the bearing is fixed to the first gear of one pair of the driven gear sets, and the other end is fixed to the first gear of the other pair of the driven gear sets; and
   the main gear is fixedly sleeved on the bearing, and the main gear and a driving gear of the driving mechanism are driven by a belt.

3. The wine cabinet according to claim 2, wherein the automatic lifting and sliding mechanism further comprises two connecting pieces, one ends of the two connecting pieces are respectively arranged at top ends of the two fixing pieces, the other ends of the two connecting pieces are respectively arranged at a bottom end of the movable cover plate, when the first gear and the second gear are respectively moved from an end position of a vertical part of the corresponding L-shaped rail to an end position of a transverse part of the corresponding L-shaped rail, the movable cover plate is driven by the two connecting pieces to rise and move along a side of the top end of the display cabinet body far away from the opening, so that the movable cover plate is far away from the opening to open the opening of the display cabinet body, when the first gear and the second gear are respectively moved from the end position of the transverse part of the corresponding L-shaped rail to the end position of the vertical part of the corresponding L-shaped rail, the movable cover plate is driven by the two connecting pieces to move along a side of the top end of the display cabinet body close to the opening and descend, so that the movable cover plate is covered to the opening to close the opening of the display cabinet body.

4. The wine cabinet according to claim 3, wherein the wine cabinet further comprises two spring assemblies arranged in the two opposite inner walls of the storage chamber, and the two spring assemblies are respectively located below the vertical parts of the L-shaped rails of the two mounting pieces; the spring assembly comprises a supporting plate mounted in the corresponding inner wall of the storage chamber, a pillar mounted in the supporting plate, a mounting frame piece mounted in the pillar, a supporting piece rotatably mounted at an end of the pillar far away from the supporting plate, and an elastic piece, one end of the elastic piece is connected with one end of the supporting piece, the other end of the elastic piece is connected with the mounting frame piece, the supporting piece is located between the pillar and the corresponding inner wall of the storage chamber, and a placing piece is arranged at a position of the pillar below the supporting piece for limiting a rotational position of the supporting piece; and a side wall of the fixing piece close to a front side of the main cabinet body is an inclined wall, when the first gear and the second gear are respectively moved from the end position of the transverse part of the corresponding L-shaped rail to the end position of the vertical part of the corresponding L-shaped rail, the inclined side wall of the fixing piece is placed on the corresponding supporting piece, and the supporting piece is abutted against the corresponding placing piece.

5. The wine cabinet according to claim 3, wherein both sides of the laminated plate are respectively provided with an accommodation space, and the two connecting pieces are respectively located in the corresponding accommodation space.

6. The wine cabinet according to claim 2, wherein the first gear and the second gear are respectively meshed with teeth at a bottom part of the corresponding L-shaped rail.

7. The wine cabinet according to claim 1, wherein the driving mechanism is a motor, the control mechanism comprises a control unit and a detection unit connected with the control unit, the motor is connected with the control unit, the detection unit is used for detecting a torque of the motor and outputting the torque to the control unit, the control unit is used for comparing the torque of the motor received with a preset torque, when the movable cover plate is moved to open the opening of the display cabinet body, if the torque of the motor exceeds a preset torque, the control unit controls the motor to stop rotating, so that the automatic lifting and sliding mechanism stops driving the movable cover plate to move, and when the movable cover plate is moved to close the opening of the display cabinet body, if the torque of the motor exceeds the preset torque, the control unit controls the motor to rotate reversely, so that the automatic lifting and sliding mechanism is driven to move reversely to recover the movable cover plate to a state in which the opening of the display cabinet body is opened.

8. The wine cabinet according to claim 3, wherein the connecting piece is L-shaped and comprises a first connecting part and a second connecting part which are connected together, the first connecting part is arranged at the top end of the corresponding fixing piece, and the second connecting part is arranged at the bottom end of the movable cover plate.

9. The wine cabinet according to claim 1, wherein the display cabinet body is made of a single-layer glass, the movable cover plate is made of a double-layer heating wire glass, and both the single-layer glass and the double-layer heating wire glass have a thickness of 6 mm to 8 mm.

10. The wine cabinet according to claim 1, wherein a first wine rack is arranged in the storage chamber, the automatic lifting and sliding mechanism is located between the first wine rack and the laminated plate, and the first wine rack has a plurality of storage areas.

11. The wine cabinet according to claim 1, wherein a second wine rack is arranged in the display chamber, the second wine rack is inclinedly arranged on the laminated plate, and the second wine rack has a plurality of placing positions.

12. The wine cabinet according to claim 1, further comprising an external control device, wherein the external control device is a remote controller, the control mechanism comprises a control unit, and the remote controller is wirelessly connected with the control unit.

13. The wine cabinet according to claim 1, further comprising an external control device, wherein the external control device is an intelligent terminal, the control mechanism comprises a control unit, the intelligent terminal comprises a control module, and the control module is wirelessly connected with the control unit.

14. The wine cabinet according to claim 1, wherein a front side of the main cabinet body is provided with a left cabinet door and a right cabinet door, and top parts of the left cabinet door and the right cabinet door are provided with handles which are close to each other.

15. The wine cabinet according to claim 14, wherein the front side of the main cabinet body is provided with a louver structure below the left cabinet door and the right cabinet door.

16. The wine cabinet according to claim 1, wherein a rear side wall in the display cabinet body is provided with a mounting plate, a top part of the mounting plate is provided with a first light stripe, and the first light stripe is connected with the control mechanism.

17. The wine cabinet according to claim 8, wherein a bottom end of the second connecting part is provided with a second light stripe, and the second light stripe is connected with the control mechanism.

18. The wine cabinet according to claim 1, wherein a length of the movable cover plate is equal to a length of the display cabinet body, and a width of the movable cover plate is half of a width of the display cabinet body.

* * * * *